(12) United States Patent
Bernards et al.

(10) Patent No.: US 9,821,254 B2
(45) Date of Patent: Nov. 21, 2017

(54) SYSTEM FOR ENGINE OIL STORAGE AND FILTRATION IN AN INTERNAL COMBUSTION ENGINE

(75) Inventors: Daniel Bernards, Lindlar (DE); Michael Dedering, Morsbach (DE); Dietmar Sahm, Reichshof (DE); Marc Buchen, Morsbach (DE); Jorge Jaspers, Morsbach (DE); Wolfgang Stausberg, Morsbach (DE)

(73) Assignee: IBS FILTRAN KUNSTSTOFF-/METALLERZEUGNISSE GMBH, Morsbach (DE)

( * ) Notice: Subject to any disclaimer, the term of this patent is extended or adjusted under 35 U.S.C. 154(b) by 369 days.

(21) Appl. No.: 13/045,931

(22) Filed: Mar. 11, 2011

(65) Prior Publication Data

US 2011/0259838 A1   Oct. 27, 2011

(30) Foreign Application Priority Data

Mar. 12, 2010   (DE) .................. 10 2010 011 348

(51) Int. Cl.
   *B01D 27/00*   (2006.01)
   *B01D 37/00*   (2006.01)
   (Continued)

(52) U.S. Cl.
   CPC ......... *B01D 29/232* (2013.01); *B01D 35/027* (2013.01); *B01D 2201/12* (2013.01);
   (Continued)

(58) Field of Classification Search
   CPC ........ B01D 27/00; B01D 27/06; B01D 27/10; B01D 29/0054; B01D 29/01; B01D 29/05;
   (Continued)

(56) References Cited

U.S. PATENT DOCUMENTS 3,317,046 A   5/1967  Raupp et al.
4,783,271 A   11/1988 Silverwater
(Continued)

FOREIGN PATENT DOCUMENTS

CN   201135815       10/2008
DE   1183750 B       12/1964
(Continued)

OTHER PUBLICATIONS

Clean Air Solutions—Filter Selection for Proper Efficiency [May 13, 2009]. See pp. 22-27, 32-35 etc.*
(Continued)

*Primary Examiner* — Bobby Ramdhanie
*Assistant Examiner* — Hayden Brewster
(74) *Attorney, Agent, or Firm* — Grossman, Tucker, Perreault & Pfleger, PLLC

(57) ABSTRACT

The invention relates to a system for engine oil storage and filtration in an internal combustion engine, comprising at least one oil storage device as part of an engine oil circuit, at least one filtration device, and at least one oil delivery pump, wherein the system is characterized in that the filtration device is connected upstream of the oil delivery pump in relation to the delivery direction of the oil, with only suction filtration being provided.

16 Claims, 4 Drawing Sheets

(51) Int. Cl.
*B01D 43/00* (2006.01)
*B01D 29/23* (2006.01)
*B01D 35/027* (2006.01)
*C02F 1/00* (2006.01)

(52) U.S. Cl.
CPC .. *B01D 2201/188* (2013.01); *B01D 2201/208* (2013.01); *B01D 2201/291* (2013.01); *B01D 2201/34* (2013.01); *B01D 2201/4046* (2013.01)

(58) Field of Classification Search
CPC ........ B01D 29/07; B01D 29/23; B01D 29/58; B01D 29/232; B01D 35/027; B01D 35/0273; B01D 35/26; B01D 35/27; B01D 35/30; B01D 35/147; B01D 35/153; B01D 35/157; B01D 37/00; B01D 43/00; B01D 2201/12; B01D 2201/34; B01D 2201/188; B01D 2201/208; B01D 2201/291; B01D 2201/4046; B01D 2400/049
USPC ........................................................ 123/196
See application file for complete search history.

(56) References Cited

U.S. PATENT DOCUMENTS

| | | | | |
|---|---|---|---|---|
| 4,938,869 | A * | 7/1990 | Bayerlein | ............ B01D 29/216 210/437 |
| 2003/0178351 | A1 | 9/2003 | Doyle et al. | |
| 2003/0226793 | A1 * | 12/2003 | Merritt | ................... B01D 29/15 210/206 |
| 2005/0016914 | A1 * | 1/2005 | Middler et al. | ............... 210/340 |
| 2006/0231057 | A1 * | 10/2006 | Futamura | ............... F01M 11/02 123/196 R |
| 2007/0151906 | A1 | 7/2007 | Beer et al. | |
| 2008/0290013 | A1 * | 11/2008 | Stausberg | ............. B01D 29/52 210/167.04 |
| 2010/0025318 | A1 * | 2/2010 | Berland et al. | ............... 210/243 |

FOREIGN PATENT DOCUMENTS

| | | | |
|---|---|---|---|
| DE | 2242199 A1 | 3/1974 | |
| DE | 3152587 A1 | 1/1983 | |
| DE | 19735444 A1 | 1/1999 | |
| EP | 1733775 A1 | 11/1956 | |
| EP | 1433512 A1 | 6/2004 | |
| GB | 1430825 A * | 4/1976 | ............. B01D 27/00 |
| GB | 2376426 A | 12/2002 | |
| JP | S45-63 | 1/1970 | |
| JP | h0315614 | 1/1991 | |

OTHER PUBLICATIONS

Helmenstine—Converting Millibars to Atmospheres [accessed Apr. 2013].*
European Search Report dated Jun. 22, 2011 for corresponding European Application No. EP11001909.8.

* cited by examiner

SYSTEM FOR ENGINE OIL STORAGE AND FILTRATION IN AN INTERNAL COMBUSTION ENGINE

FIELD

The invention relates to a system for engine oil storage and filtration in an internal combustion engine, comprising at least one oil storage device as part of an engine oil circuit, at least one filtration device, and at least one oil delivery pump.

PRIORITY

This application claims priority to German Patent Application No. DE 10 2010 011 348.4, filed Mar. 12, 2010, the disclosure of which is hereby incorporated by reference.

BACKGROUND

What are known above all are pressure oil filters in the oil circuit of internal combustion engines. Said pressure oil filters are connected downstream of the engine oil pump and are attached, usually so as to be exchangeable, to the engine housing or to the cylinder head. The conventional oil filters are afflicted with the disadvantage that they take up a relatively large amount of installation space, in particular because it must be ensured that they are accessible for servicing.

Pressure oil filters are often attached to an adapter, which necessitates further installation space and entails additional costs. In general, long oil lines lead to the adaptation points, which oil lines must usually be drilled, which can entail high costs and also an additional risk of contamination as a result of drilling residues in the engine block and cylinder head.

Virtually all pressure oil filters are arranged in the partial flow of the pump, such that contaminated oil is purified only gradually (partial flow principle).

To keep the filter element free from high oil pressures in particular in cold operating states of the engine or of the internal combustion engine, pressure oil filters generally contain a bypass valve, such that unfiltered oil is initially supplied to the engine lubricating points at low oil temperatures. Such an arrangement is complex and entails additional costs.

DE 197 35 444 A1 discloses an oil filter insert for oil pans of engines and transmissions with integrated suction oil filtration and pressure oil filtration, wherein a filter unit for suction filtration and a filter unit for pressure filtration of engine or transmission oils is arranged on a seal carrier frame. The oil filter insert described in DE 197 35 444 A1 is duly described as being suitable for engine oil filtration but is designed and can be used only for transmission oil filtration of automatic transmissions, in particular because significantly larger engine oil volume flows are circulated in engine oil circuits of internal combustion engines.

SUMMARY

The invention is based on the object of providing a system for engine oil storage and filtration in an internal combustion engine, which system is improved in relation to known systems for engine oil filtration with regard to functional reliability and costs and with regard to the required installation space.

The object is achieved firstly by means of a system for engine oil storage and filtration in an internal combustion engine, comprising at least one oil storage device as part of an engine oil circuit, at least one filtration device, and at least one oil delivery pump, wherein the system is characterized in that the filtration device is connected upstream of the oil delivery pump in relation to the delivery direction of the oil. Such a system can advantageously be integrated into the engine oil pan and thereby utilizes hitherto unutilized installation space in the crankcase or engine housing and the oil pan.

Within the context of the invention, an oil storage device may be understood to mean both an oil pan in the conventional sense and also an oil container of a dry pan lubrication facility.

The system according to the invention also has the advantage that the attachment of the filtration device in the oil pan does not necessitate any further oil lines, threaded bores and sealing points in or on the engine housing.

In one advantageous variant of the system according to the invention, only suction filtration is provided. Contrary to previous opinions, it is entirely possible for the filtration device to be designed with such low flow resistances that pressure oil filtration can be dispensed with.

In one advantageous variant of the system according to the invention, the filtration device is arranged in the main flow of the oil delivery pump, or the oil delivery pump is connected directly at the suction side to the filtration device.

The filtration device is expediently arranged within the oil storage device. Since the filtration device itself is fully flooded with oil, the associated volume loss within the oil storage device or oil pan is relatively small.

In a particularly expedient variant of the system according to the invention, it is provided that the filtration device is designed as an exchangeable filter insert of the oil pan.

The filtration device, with the exception of the filter medium, may also be formed as an integral constituent part of the oil pan.

The filtration device may for example be accessible via a correspondingly designed inspection opening in the oil pan. In a particularly advantageous variant of the invention, an oil drainage device, in the form of an oil drainage screw or the like arranged in an inspection cover, is arranged in said inspection opening.

The filter insert expediently comprises at least one filter housing and at least one filter element provided in the filter housing.

In a particularly advantageous variant of the system, it is provided that the filter element comprises, in the flow direction of the oil, at least one first and one second filtration layer, wherein the filter medium of the first filtration layer is more dense than the filter medium of the second filtration layer. It is for example possible for the filter medium of the first filtration layer to be formed as a relatively dense filter nonwoven or filter fabric, and the filter medium of the second filtration layer may be formed for example as an open filter screen.

It is particularly expedient for the first and second filtration layers to be spaced apart from one another in regions and for the first filtration layer to be provided, in the regions spaced apart from the second filtration layer, with flow bypasses. In this way, it is ensured in particular when the engine oil is cold that the flow resistance of the filtration device is kept within predefined limits.

It has proven to be particularly advantageous for a passage hole arrangement to be provided as flow bypasses in the first filtration layer. When the engine oil is relatively cold, a part of the oil will initially flow through the passage hole arrangement in the first filtration layer, wherein said oil is subjected to fine filtration by means of the second filtration layer. In contrast, the first filtration layer subjects the oil to extra-fine filtration. The desired oil purity is generated overall in that the oil, with increasing temperature, which is associated with a continuously decreasing viscosity, is conducted to an ever greater degree through the filter medium of the first filtration layer. The proportion of the oil flowing through the openings of the first filter medium continuously decreases with increasing temperature.

The passage hole arrangement of the first filtration layer is designed in terms of form and size as demanded by the respective application or engine type. The design parameters include substantially the pump suction power, the pump delivery power, the specific introduction of dirt into the oil occurring as a result of operation, and the viscosity of the oil used.

The first filtration layer is preferably folded (pleated). The passage hole arrangement may be provided both in the region of the folds of the fold arrangement and also in the region of flanks of the folds. The passage hole arrangement may be of any size, form and configuration. This applies both to the design of the holes themselves and also to the configuration of the passage hole arrangement in the filtration layer. Said arrangement may be provided in the form of a repeating pattern on the filtration layer. The configuration of the passage hole arrangement may be either symmetrical or asymmetrical.

The first filtration layer may for example take the form of a cylindrical, pleated filter cartridge which is surrounded by a second filtration layer for example in the form of a cylindrical metal grate.

Chambers are advantageously provided in each case between the first and second filtration layers, the delimiting walls of which chambers are formed partially by the flanks of the folds of the first filtration layer. The chambers are defined by the flanks of the folds of the first filtration layer and of the lateral surface defined by the second filtration layer.

In one expedient variant of the system according to the invention, it is provided that the filter housing has at least one intake connecting piece for the suction-side connection of the oil pump.

In one advantageous embodiment of the system according to the invention, it is provided that the pressure losses generated in the filtration device under normal operating conditions are ≤400 mbar.

The filter housing is expediently arranged at the lowest point of the oil pan.

The filter housing preferably comprises at least one partial-flow duct which connects the intake connecting piece directly, in the installed position, to the upper region of the filter housing. The intake connecting piece may for example open out into the lower part or lower region of the filter housing. Air/gas which collects under some. circumstances approximately in the upper region of the filter housing is drawn, preferably utilizing the venturi effect, via the partial-flow duct into the main intake flow of the oil pump in such a way that cavitation in the pump is reliably prevented.

The invention also relates to a filter insert having the features of one of the preceding claims.

The object on which the invention is based is finally achieved by means of a method for engine oil circulation and filtration in an internal combustion engine, which method is characterized in that the engine oil is subjected to only suction oil filtration.

According to the invention, the filtration of the oil takes place in multiple stages, with a first filtration being carried out with a relatively dense filter medium and a second filtration being carried out with a relatively open filter medium.

BRIEF DESCRIPTION OF THE DRAWINGS

The invention will be explained below on the basis of an exemplary embodiment illustrated in the drawings, in which.

DETAILED DESCRIPTION

The filter insert 1 according to the invention comprises a filter housing 2 composed of thermoplastic material and a filter element 3 inserted into the filter housing 2.

Figure 3:
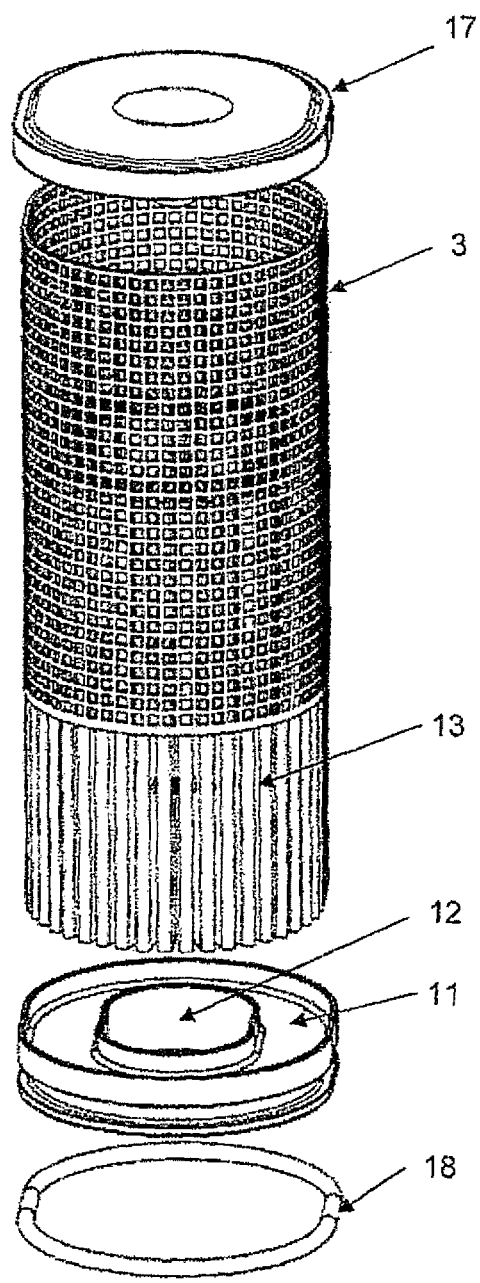
FIG. 3 shows an exploded view of the filter element inserted into the filter housing.

The filter insert 1 is arranged within an oil pan 4 of an internal combustion engine of a passenger vehicle or utility vehicle in the region of an inspection opening of the oil pan 4. The inspection opening 5 is situated, in the installed position, at the lowest point of the oil pan 4, and said inspection opening 5 is closed off by means of an inspection cover 6. The filter housing 2 defines an approximately cylindrical receiving space for the filter element 3, which is likewise cylindrical, as illustrated in FIG. 3. Of corresponding design are the inspection opening 5 and the inspection cover 6, which is provided with a central oil drainage opening 7 which in turn is closed off by means of an oil drainage screw 8 with the interposition of an O-ring seal 9.

The filter element 3 is held in its position with respect to the filter housing 2 by means of webs 10 attached to the inspection cover 6. The webs 10 are supported against an, in the installed position, lower cover 11 of the filter element 3. The webs 10 serve simultaneously to define the spacing between the filter element 3 and the inspection cover 6, in such a way that the inlet 12 of the filter element 3 is left free.

The filter element 3 is illustrated in an exploded view in FIG. 3. Said filter element 3 comprises a first, inner filter medium 13 in the form of a pleated fabric or nonwoven filter, and a second filter medium 14, which surrounds the first filter medium 13, in the form of a wire cage or wire grate. In the drawing, the mesh spacings of the second filter medium are illustrated as being exaggeratedly large.

The first filter medium 13 is designed as an extra-fine filter medium, whereas the second filter medium 14 is designed as a fine filter medium. The first filter medium 13 is designed as a relatively dense filter medium, whereas the second filter medium 14 is designed as a relatively open filter medium.

In the exemplary embodiment described, the engine oil to be filtered flows initially through the first filter medium 13 and then through the second filter medium 14. The oil flows from the center of the filter element 3 outward into the filter housing 2, and from there to the oil pump (not illustrated), as will be explained further below.

Within the context of the invention, however, an oil flow from the outside through the filter media into the center of the filter element 3 and from there to the oil pump is also possible. This requires a corresponding arrangement of the filter media relative to one another.

Figure 1:
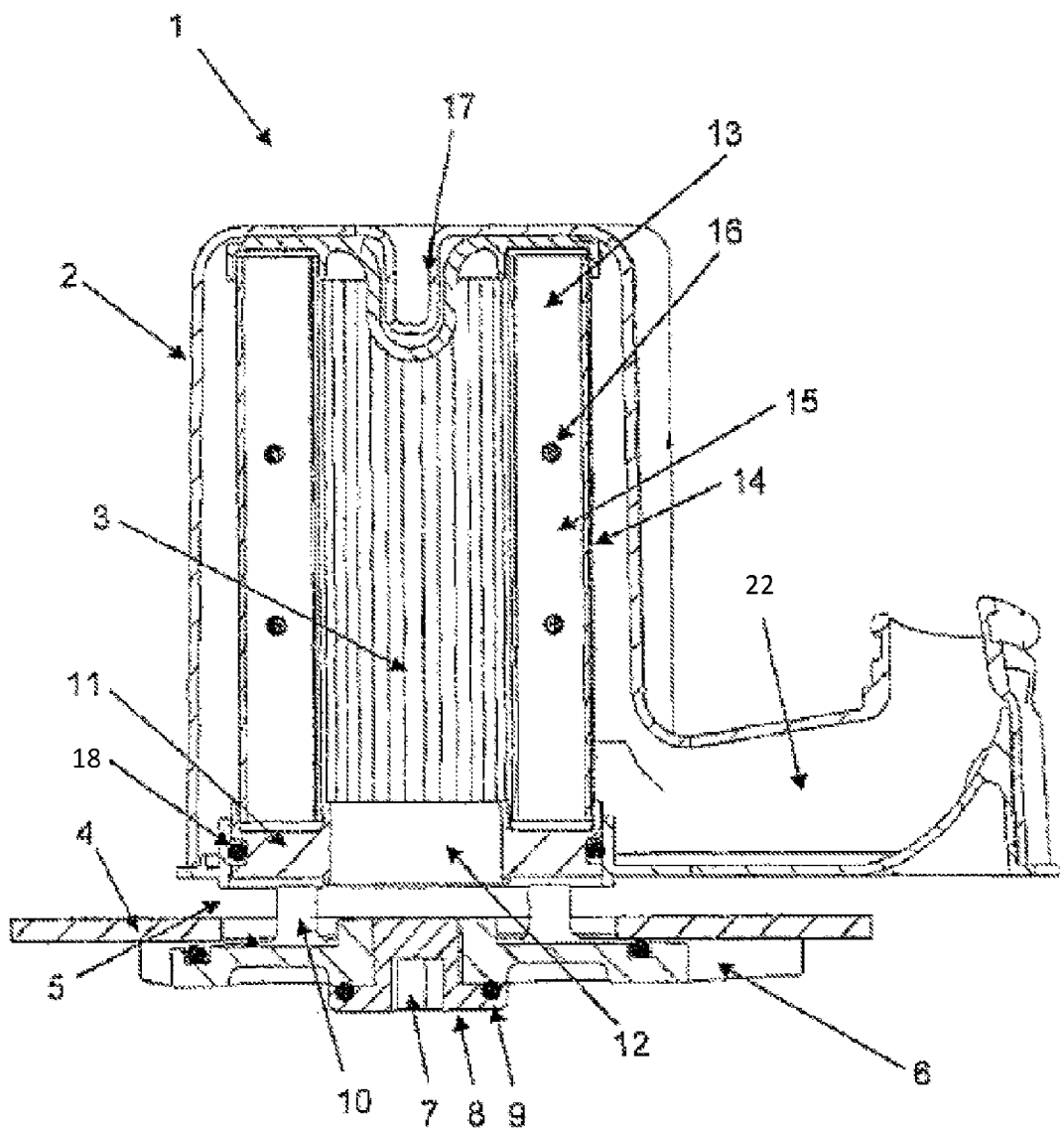
FIG. 1 shows a section through a filtration device according to the invention in the installed situation.

As can be seen in particular from a juxtaposition of FIGS. 3 and 1, the first filter medium 13 is pleated (folded), the flanks 15 of the first filter medium 13 being provided with a passage hole arrangement 16.

In the exemplary embodiment described, the passage hole arrangements are selected such that two encircling hole ducts are formed, wherein the size and configuration of the passage hole arrangement and also the number of holes are a matter of design. In each case two opposite flanks 15 of the first filter medium and the associated lateral surface of the second filter medium 14 define a chamber with an approximately triangular cross section. In the region of each chamber, the first filter medium 13 is spaced apart from the second filter medium 14. As a result of the pleated design of the first filter medium 13, a multiplicity of folds and chambers are formed over the circumference of the first filter medium 13.

As can be seen from FIG. 3, the second filter medium surrounds the first filter medium 13. The arrangement is held together by means of an upper cover 17 and the lower cover 11 and forms a filter cartridge/filter element 3 which is detachably inserted into the filter housing 2 which is arranged in a positionally fixed manner in the oil pan 4, and said filter cartridge/filter element 3 is held in the filter housing 2 by means of the webs 10. In particular, the first filter medium may for example be cohesively connected to the upper and lower covers 17, 11.

The second filter medium 14 may be formed either from steel/high-grade steel or for example as a polyamide grate.

The lower cover 11 of the filter element 3 is sealed off by means of an O-ring seal 18 against a sealing seat 19, which is formed as a collar, of the filter housing 2. Within the filter housing 2, the filter element 3 is centered by means of a peg 20 which projects inward into the housing.

After the inspection cover 6 of the oil pan 4 is detached, the filter element 3 can be detached or removed as a whole from the filter housing 2 in order to be exchanged.

Figure 2:
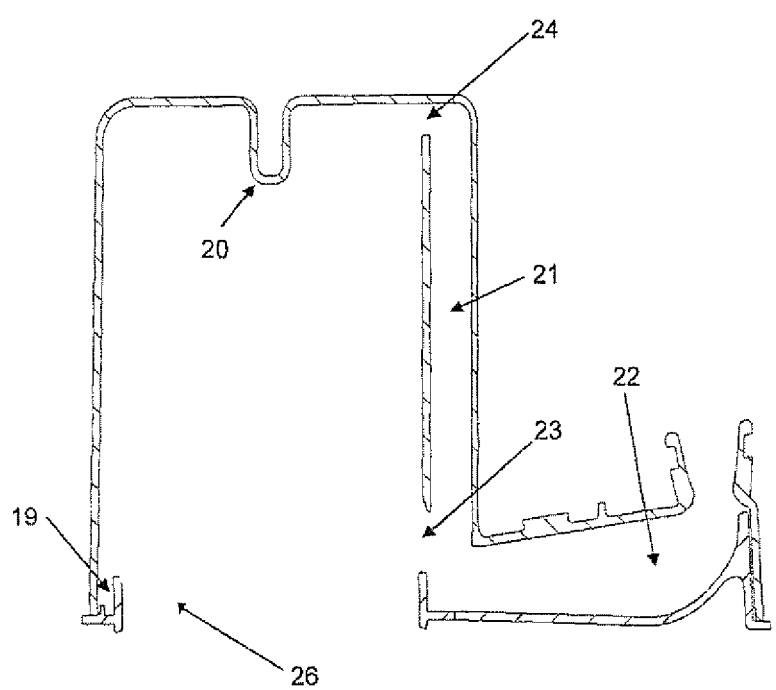
FIG. 2 shows a sectional view through the filter housing.
Figure 4:
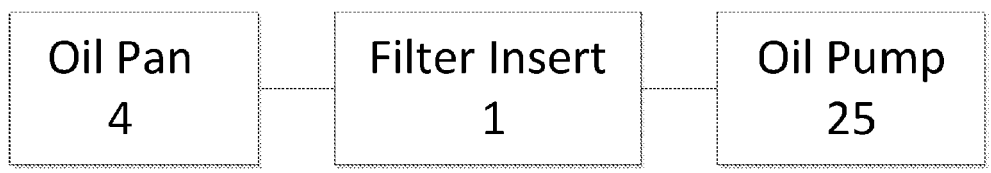
FIG. 4 shows a block diagram of one embodiment of a system for engine oil storage and filtration.

The filter housing 2 (see FIG. 2) comprises a partial-flow duct 21 which extends from the uppermost delimitation of the filter housing 2 into an intake connecting piece 22 which is connected directly to the suction side of an engine oil pump 25 (See FIG. 4). Furthermore, the intake connecting piece 22 opens out directly into the lower part of the filter housing 2 via the intake opening 23. In the upper region of the filter housing 2, the partial-flow duct 21 is connected via the intake opening 24 to that volume of the filter housing 2 which is provided for the filter element 3. The lower intake opening 23 is dimensioned so as to be larger than the intake opening 24, such that the main oil flow sucked in through the intake opening 24 generates a suction action in the partial-flow duct 21, with the effect that any air which collects in the upper region of the filter housing 2, for example after an oil filling process or in the event of foaming oil, is concomitantly drawn into the intake connecting piece 22 in such a way that cavitation in the engine oil pump 25 is reliably prevented.

On account of the vacuum generated by the engine oil pump, the engine oil is drawn through the inlet 12, which is designed as an oval inlet opening in the lower cover 11 of the filter element 3, into the interior of the first filter medium 13. From there, the engine oil flows through the first filter medium 13 and subsequently penetrates through the second filter medium 14 which lies over said first filter medium 13, wherein in the cold state a partial quantity of the engine oil flows through the passage hole arrangement 16 and passes, through the pockets/chambers generated by the folds of the first filter medium 13, directly through the second filter medium 14. As the engine oil warms up further, it penetrates through the relatively dense filter fabric/filter nonwoven of the first filter medium 13 outside the passage hole arrangement, as a result of which extra-fine filtration is realized for the first time.

On account of the multi-stage design of the filter element 3, in particular as a result of the provision of a passage hole arrangement 16 with a spacing to the second filter medium 14, it is possible for the flow resistance upstream of the oil pump and the flow resistance of the entire filtration device to be kept relatively low, such that cavitation in the pump is reliably prevented.

As a result of the position of the filter insert 1 at the lowest point in the engine in conjunction with the oil drainage device situated directly underneath, during an exchange of the filter element 3, any loosely adherent dirt is reliably entrained by the oil flowing out and is flushed out of the oil pan.

The accessibility of the system during a filter exchange is ensured, and does not involve great expenditure because during an associated oil change, work must be carried out at this location in any case when the oil is drained. The filter insert 1 itself is accessed in a simple manner through the inspection cover 6 which is screwed to the oil pan 4 from the outside.

The operational reliability is increased in that the number of leakage points from the engine to the environment is reduced. Furthermore, the oil pump is protected against damage which may arise on account of unfiltered oil. As a result of the low flow resistance generated by the filter element 3, the oil pump requires a lower drive power than is necessary with conventional pressure oil filtration. In this way, the efficiency of the pump and therefore of the engine is increased in particular when the engine is cold.

LIST OF REFERENCE NUMERALS

1 Filter insert
2 Filter housing
3 Filter element
4 Oil pan
5 Inspection opening
6 Inspection cover
7 Oil drainage opening
8 Oil drainage screw
9 O-ring seal
10 Webs
11 Lower cover, filter element
12 Inlet
13 First filter medium
14 Second filter medium
15 Flanks
16 Passage hole arrangement
17 Upper cover
18 O-ring seal
19 Sealing seat
20 Peg
21 Partial-flow duct
22 Intake connecting piece
23 Intake opening
25 Engine oil pump

What is claimed is:

1. A system for engine oil storage and filtration in an internal combustion engine, the system comprising:
at least one oil storage device as part of an engine oil circuit;
at least one filtration device comprising a housing and a filter element; and at least one oil delivery pump;

wherein:

the at least one filtration device is disposed upstream of the at least one oil delivery pump in relation to a delivery direction of oil from the oil storage device;

the filter element has a cylindrical shape, comprises an inlet, and is configured to be disposed within the housing;

wherein:

the housing comprises:

a partial flow duct formed at a location between the filter element and an outer wall of the housing;

a first intake opening within the partial flow duct and downstream of the at least one oil storage device;

a second intake opening formed within the partial-flow duct and in direct fluid communication with the first intake opening; and an intake connection piece downstream of the first intake opening;

the first intake opening leads to the intake connection piece;

the second intake opening is arranged at a higher elevation of the housing than the first intake opening;

the partial-flow duct is in fluid communication with both the first intake opening and the second intake opening;

the at least one oil delivery pump is connected to the intake connection piece and is configured to draw oil from the at least one oil storage device into the inlet and through the filter element; and the first intake opening and second intake opening are configured to receive at least a portion of a flow of oil that has passed through the filter element.

2. The system according to claim 1, wherein the at least one filtration device is arranged in a main delivery flow of the at least one oil delivery pump.

3. The system according to claim 1, wherein the at least one filtration device is arranged within the at least one oil storage device.

4. The system according to claim 1, wherein the at least one oil storage device is an oil pan.

5. The system according to claim 1, wherein the filter element comprises a filter, the filter comprising, in a flow direction of the oil, a first filtration layer comprising a first filtration medium and a second filtration layer comprising a second filtration medium, wherein the first filtration medium is denser than the second filtration medium and the first filtration layer is upstream of the second filtration layer.

6. The system according to claim 5, wherein the first filtration layer and the second filtration layer are spaced apart from one another, and flow bypasses are provided within the first filtration medium of the first filtration layer.

7. The system according to claim 6, wherein said flow bypasses comprise one or more passage holes in the first filtration medium.

8. The system according to claim 7, wherein the first filtration medium is a folded filter medium comprising folds, and at least one of said one or more passage holes is formed in a flank region of said folds.

9. The system according to claim 8, further comprising one or more chambers between the first filtration layer and the second filtration layer, wherein delimiting walls of the first filtration layer and the second filtration layer are formed at least in part by the flank region of said folds of said first filtration medium.

10. The system according to claim 1, wherein said housing further comprises at least one intake connecting piece for connecting to a suction-side connection of the at least one oil delivery pump.

11. The system according to claim 1, wherein said housing is arranged at a lowest point of the oil pan.

12. The system according to claim 1, wherein the first intake opening is larger than the second intake opening.

13. The system according to claim 12, wherein, during operation, the partial-flow duct draws gas from an upper region of the housing into a main intake of the oil delivery pump, via a venturi effect.

14. The system according to claim 13, wherein the partial flow duct draws said gas from oil prior to the oil passing through the intake connecting piece, and thereby prevents cavitation in the at least one oil delivery pump.

15. The system of claim 1, wherein:

the filter element comprises a filter, the filter comprising a first filtration layer and a second filtration layer, wherein:

the first filtration layer comprises a first filtration medium and the second filtration layer comprises a second filtration medium;

the first filtration medium is a folded filter medium that is more dense than the second filtration medium; and at least one flow bypass is present within the first filtration layer, the flow bypass including at least one passage hole.

16. The system according to claim 15, wherein the first filtration layer is upstream of the second filtration layer.

* * * * *